United States Patent Office 3,196,145
Patented July 20, 1965

3,196,145
REACTIVE DISAZO DYESTUFFS
Marcel Reding and Werner Bossard, Riehen, near Basel, Switzerland, assignors to J. R. Geigy A.-G., Basel, Switzerland
No Drawing. Filed Mar. 29, 1962, Ser. No. 183,351
Claims priority, application Switzerland, Mar. 30, 1961, 3,852/61
5 Claims. (Cl. 260—153)

The invention concerns reactive disazo dyestuffs which can be fixed onto cellulose fibres, processes for the production of these dyestuffs as well as their use to attain fast cellulose dyeings and, as industrial product, the material dyed with the aid of the dyestuffs.

It has been found that valuable disazo dyestuffs are obtained if 1 mol of an amino disazo dyestuff of the general formula

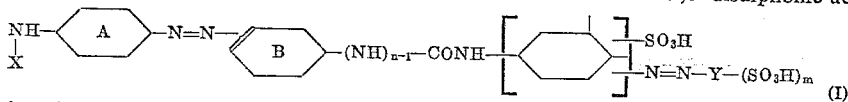

in which the benzene nuclei A and B can also contain further nonwater solubilising substituents, and wherein X represents hydrogen or a lower alkyl group,
$n$ represents a positive whole number of at most 2,
$m$ represents a positive whole number of at least 1, and
Y represents the radical of a 1-aryl-5-pyrazolone compound coupled in o-position to the enolic hydroxy group, is acylated with 1 mol of a compound which, on completion of the reaction, still contains at least one substituent which can bring about the chemical bond with the substrate.

The benzene rings A and B can contain e.g. lower alkyl and alkoxy groups, such as methyl, ethyl, methoxy or ethoxy groups, acylamino groups, such as acetylamino or carbomethoxyamino groups as well as halogen atoms such as fluorine, chlorine or bromine as non-water solubilising substituents.

The radical Y which is coupled in o-position to the enolic hydroxyl group, is derived from a 1-sulphoaryl-5-pyrazolone compound.

In the production of starting materials usable according to the invention, aminobenzene, 1-amino-3-methylbenzene, -ethylbenzene, methoxybenzene or -ethoxybenzene, 1-amino-2-methoxy-5-methylbenzene, 1-amino-2,5-dimethoxybenzene, 1-amino-2,5-dimethylbenzene, 1-amino-3-carbomethoxy - aminobenzene or 1-amino-3-carboethoxy-aminobenzene, 1-amino-3-acetyl-aminobenzene, 1-amino-3-ureidobenzene, 1-amino-3-chlorobenzene, monomethylaminobenzene, monoethylaminobenzene, 1-methylamino-3-methyl- or methoxy- benzene are used, for example, as coupling components forming the basis of the radical

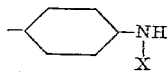

The radical X is preferably hydrogen.

As middle components introducing the benzene ring B in the production of the starting materials usable according to the invention are used preferably an m- or p-aminobenzoylamino-m- or p-phenylenediamine sulphonic acid or a diaminodiphenyl urea sulphonic acid, e.g. 5-(3'-aminobenzoylamino)- or 5-(4'-aminobenzoylamino)-2-aminobenzene - 1 - sulphonic acid, 5-(3'-aminobenzoylamino)- or 5-(4'-aminobenzoylamino)- 1-aminobenzene-2-sulphonic acid, 5-(3'-amino-4'-methyl-, -4'-methoxy- or 4' - chloro- benzoylamino)-2-aminobenzene-1-sulphonic acid or -1-carboxylic acid. Because of their easier accessibility, their favourable behaviour in the production of the dyestuff and their advantageous effect on the shade and drawing power, the 5-(3'- and 5-(4'-aminobenzoylamino)-2-aminobenzene-1-sulphonic acids are preferred. 4,4'-diaminodiphenyl urea-3'-sulphonic acid, 3,4'-diaminodiphenyl urea-3'-sulphonic acid, 3- or 4,3'-diaminodiphenyl urea-4'-sulphonic acid, 4,3'-diamino-3-methyl-diphenyl urea-4'-sulphonic acid, 4,4'-diamino-3-methyldiphenyl urea-3'-sulphonic acid are used, for example, as middle components containing a urea group. Also here the 4'-amino-3'-sulphonic acid compounds are preferred.

2',4'- or 2',5'-disulphophenyl-3-methyl-5-pyrazolone, 1 - (2' - chloro-5'-sulphophenyl)-3-carboxy-5-pyrazolone, 1 - (2'-chloro-5'-sulphophenyl)-3-methyl-5-pyrazoline, 1-naphthyl-(2')-3-methyl-5-pyrazolone-3',6'- or -4',7'- or -4',8'- or -5',7'- or -6',8'-disulphonic acid, 1-naphthyl-(1')-3-methyl-5-pyrazolone-3',6'- or 5',7'- or -4',6'- or -4',7'- or 4',8'-disulphonic acid are used as coupling components introducing the radical Y in the production of amino diazo dyestuffs usable according to the invention. The 2',5-disulphophenyl-3-methyl-5-pyrazolone is especially preferred.

The amino diazo dyestuffs usable according to the invention are obtained, for example, by combining a tetrozotised m- or p-aminobenzoyl-p- or m-phenylenediamine sulphonic acid or a diaminodiphenyl urea sulphonic acid with an aminobenzene derivative coupling in the p-position to the amino group and coupling the resulting intermediate product with an arylpyrazolone sulphonic acid. Another method of production consists in diazotising an m- or p-nitrobenzoyl-m- or -p-phenylenediamine sulphonic acid or m- or p-nitrophenylureido-m- or -p-aminobenzene sulphonic acids and coupling with arylpyrazolone sulphonic acids, reducing the resultant nitro-monoazo dyestuffs for example with sodium sulphide to form the corresponding amino azo dyestuff, further diazotising and combining with an aminobenzene coupling in the p-position to the amino group. The components should be so chosen that in one molecule of amino disazo dyestuff there are preferred at least 3 and possibly 4 water solubilising groups such as sulphonic acid or carboxylic acid groups.

The aminodisazo dyestuffs used according to the invention are acylated advantageously by the use of the aqueous solution of their alkali metal salts. The acylating agents are allowed to act at temperatures of 0–80° C. with the gradual addition of agents which buffer mineral acid such as sodium acetate, sodium formate, sodium carbonate or sodium bicarbonate. The acylation is performed preferably at a slightly acid pH. Also the isolation of the acylation products by salting out with sodium chloride is performed advantageously at a neutral to acid reaction of the liquid medium. The dyestuffs are dried advantageously at a moderate heat, possibly under reduced pressure.

As acylating agents for the reaction with amino disazo dyestuffs usable according to the invention, reactive derivatives of carboxylic acid which contain at least one mobile halogen atom or an olefinic group capable of addition, also heterocyclic halogen imides of carbonic acid which contain at least 2 mobile halogen atoms are used. The principal reactive derivaties of such carboxylic acids are the acid halides or also the acid anhydrides, for example those of saturated or unsaturated β-halogen fatty acids such as β-chloro- and β-bromopropionic acid, β-chloro- and β-bromoacrylic acid, α,β- and β,β-dichloro- or α,β- and β,β-dibromoacrylic acid, of trichloro- or tribromo-acrylic acid, β-chlorocrotonic acid, dichloro- and dibromo-maleic acid, monochloro- and monobromo-fumaric acid, dichloro- and dibromo-fumaric acid, or halides or anhydrides of α,β-unsaturated fatty acids such as acrylic acid, methacrylic acid, propiolic acid, crotonic acid and fumaric acid. In particular, polyhalogen di- or triazines such as tetrameric cyanogen chloride or bromide, cyanuric chloride, cyanuric bromide, 2,4-dichloro- or 2,4-dibromo-1,3,5-triazines which contain, for example, a phenyl, alkoxy, alkylmercapto, amino, in particular a substituted amino group, e.g. a sulphonated phenylamino group, in the 6-position; also 2,4,6-trichloropyrimidine and 2,4,6-tribromo-pyrimidine as well as derivatives thereof which contain a methyl, ethyl group, a carbocylic acid or sulphonic acid amide, carboxylic acid methyl or ethyl ester group possibly substituted at the nitrogen atom, in the 5-position, 2,6-dichloro- or 2,6-dibromo-pyrimidine 4-carboxylic acid ethyl esters, 2,4,5-trichloro-pyrimidine, 2,5,6-trichloro-4-methyl-pyrimidine, 2,4 - dichloro-5-chloromethyl-6-methyl pyrimidine, but preferably 2,4,5,6-tetrachloro- or 2,4,5,6-tetrabromo-pyrimidine are used as preferred cyclic imide halides of carbonic acid.

Particularly valuable reactive dyestuffs correspond to the formula $$Z-NH-A-N=N-B-(NH)_{n-1}-CO-NH-\langle\overset{SO_3H}{\phantom{x}}\rangle-N=N-CH-\underset{CO}{\overset{}{|}}-\underset{N}{\overset{}{C}}-Q$$
$$\underset{Y-(SO_3H)_m}{\overset{N}{|}}$$

wherein

A represents a radical of the benzene series free from the acidic water soluble groups —COOH and —SO₃H and linked in a para position to the —NH— group and to the azo group respectively, B represents a radical of the benzene series free from the acidic water soluble groups —COOH and —SO₃H and linked in a position, other than in a ortho position, to the —(NH)$_{n-1}$ group and to the azo group respectively, Y is the phenyl, methylphenyl, chlorophenyl or the naphthyl radical, Q is the CH₃ or the COOH group, Z is the polyhalogen-pyrimidyl, halogen-1,3,5-triazinyl, β-halogen-lower-alkyl-fatty acid or the CH₂=CH—CO— radical, the halogen having atomic weight of 35 to 80, e.g. chlorine or bromine, and n and m are a whole number from 1 to 2.

The radical A is an unsubstituted or preferably a mono- or di-substituted phenylene radical, preferred substituents being methyl, methoxy, acetylamino and carbomethoxy-amino groups.

The radical B is preferably an unsubstituted phenylene radical. B also can be a substituted phenylene radical, methyl, methoxy and chlorine being preferred substituents.

The radical Y is preferably the phenyl radical and Q is preferably the —CH₃ group, n represents preferably 1, and m is preferably 2.

Examples of the reactive radical Z are principally:

(a) Halogen-pyrimidyl radicals such as dihalogen pyrimidyl radicals, e.g. the 2,6-dichloro-pyrimidyl-(4) radical or the 2,6-dibromo-pyrimidyl-(4)-radical which can contain a substituent in the remaining position, e.g. acetyl and, in particular, a further halogen atom e.g. the 2,5,6-trichloropyrimidyl-(4) radical or the 2,6-dichloro-5-acetyl-pyrimidyl-(4) radical, (b) Halogen-1,3,5-triazinyl radicals which in the remaining position contain a substituent, in particular halogen, alkylamino or alkoxy groups, e.g. the 4,6-dichloro- or 4,6-dibromo-1,3,5-triazinyl radical, or 4-chloro-6-methyl-amino-, 4-bromo-6-methylamino, 4-chloro or 4-bromo-6 sulphophenylamino-1,3,5-triazinyl radical, the 4-chloro-6-methoxy- or 4-chloro-6-ethoxy-1,3,5-triazinyl radical, (c) β-Halogen fatty acid radicals containing at most 4 carbon atoms such as β-halogen alkanoyl radicals, e.g. the β-chloro- or β-bromopropionyl radical and particularly β-halogen alkenoyl radicals, e.g. the β-bromoacrylyl radicals, the β-chlorocrotonyl or β-bromocrotonyl radical, (d) Groups capable of addition, such as the $$CH_2=CH-CO-$$

radical.

Halogen in the radicals mentioned is, in particular, chlorine but it can also be bromine.

In addition, dyestuffs which contain the dichloropyrimidyl group and, especially, the trichloropyrimidyl group are preferred.

The new dyestuffs are yellow and orange powder, which, in the form of their alkali metal salts, dissolve very well in water. They are suitable for the dyeing and printing of fibres, in particular those from natural or regenerated cellulose and from natural or synthetic polyamide fibres, in yellow to orange-yellow shades. The cellulose material is advantageously impregnated or printed at low temperatures, e.g. of 20–50° C., and the colour is fixed by treatment with acid binding agents, e.g. with sodium carbonate, potassium carbonate, di- and tri- sodium phosphate or caustic soda lye. The treatment with these agents can be performed at room temperature or at a raised temperature. In many cases, the acid binding agents can be added to the impregnating liquors or printing pastes whereupon the dyeing is developed by a short heating at temperatures of over 100 to 160° C. of by a longer storing at room temperature.

The new dyestuffs are chemically bound to the fibre by this treatment with acid binding agents and, after soaping to remove non-fixed dyestuff, the cellulose dyeings in particular have excellent wet fastness properties.

A particular advantage of the dyestuffs according to the invention is an increased substantivity to cellulose fibres. They are particularly suitable, therefore, for the dyeing of cellulose from a bath in which the liquor ratio is greater than usual, in particular in the presence of salts to accelerate the drawing power such as Glauber's salt or sodium chloride. Surprisingly, in spite of this increased substantivity, unfixed dyestuff is very easily and completely washed out which is an important requirement for the good wet fastness of cellulose dyeing attained with reactive dyestuffs.

The following examples illustrate the invention. Parts are given therein as parts by weight when not otherwise specifically stated. The temperatures are in degrees centigrade. The relationship of parts by volume to parts by weight is as that of cubic centimeters to grammes.

EXAMPLE 1

33.7 parts of 5-(3'-nitrobenzoylamino)-2-aminobenzene-1-sulphonic acid are dissolved, in the form of the sodium salt, in 400 parts of water, 6.9 parts of sodium nitrite are added and diazotisation is performed at 10–15° by sprinkling in 30 parts of concentrated hydrochloric acid. This diazonium compound is poured within 1 hour and while stirring into a neutralised solution of the sodium salt of 33.4 parts of the sodium salt of 33.4 parts of 2',5'-disulphophenyl-3-methyl-5-pyrazolone to which has been added 25 parts of sodium acetate. The coupling to form the nitromonoazo dyestuff is completed in a weakly acid medium (pH 4–5). The neutralised dyestuff solution is reduced with 11.7 parts of sodium sulphide at 45° for 4–5 hours. The aminomonoazo dyestuff formed is acidified, filtered off, dissolved again as the sodium salt and the solution is clarified to remove sulphur. The aminoazo dyestuff is diazotised at 0–5° by the addition of 6.9 parts of sodium nitrite and 30 parts of concentrated hydrochloric acid. 10.7 parts of 1-amino-3-methylbenzene are added to the acid diazo suspension of the monoazo dyestuff. The coupling is accelerated by the dropwise addition of a sodium acetate solution until the pH is 4.5. On completion of the coupling, the solution of the amino disazo dyestuff is neutralised at 60°–65° with sodium carbonate. 24 parts of finely pulverised 2,4,5,6-tetrachloropyrimidine are sprinkled into the solution within 1 hour and the neutral reaction of the mixture is maintained by the dropwise addition of sodium carbonate. When no more free aminoazo dyestuff can be traced by diazotising and coupling, the end product of the formula chloro-3'-nitrobenzoylamino)-2 aminobenzene-1-sulphonic acid are used and otherwise the procedure described above is followed.

Similar dyestuffs are also obtained if, in the above example, instead of the 1-amino-3-methylbenzene or the 2',5'-disulphophenyl-3-methyl-5-pyrazolone, the corresponding amount of one of the coupling components given in the following table is used and the amino disazo dyestuffs obtained are reacted with one of the acid halides or halogenazines given in the last column of the table.

*Table 1*

| No. | Diazo component | 1st coupling component | 2nd coupling component | Acylating agent | Shade on cotton |
|---|---|---|---|---|---|
| 1 | 5-(3'-nitrobenzoylamino)-2-aminobenzene-1-sulphonic acid. | 2',4'-disulphophenyl-3-methyl-5-pyrazolone. | 1-aminobenzene. | 2-(2'-sulphophenylamino)-4,6-dichloro-1,3,5-triazine. | Yellow. |
| 2 | ----do---- | 1-(2'-chloro-5'-sulphophenyl)-3-carboxy-5-pyrazolone. | 1-amino-2,5-dimethylbenzene. | β-chlorocrotonic acid chloride. | Do. |
| 3 | ----do---- | 1-naphthyl-(1')-3-methyl-5-pyrazolone-4',8'-disulphonic acid. | 1-methylamino-3-methylbenzene. | 2,4,5,6-tetrachloropyrimidine. | Do. |
| 4 | 5-(3'-nitro-4'-chlorobenzoylamino)-2-aminobenzene-1-sulphonic acid. | 2',5'-disulphophenyl-3-methyl-5-pyrazolone. | 1-amino-2-methoxy-5-methylbenzene. | 2,4,6,-trichloropyrimidine. | Do. |
| 5 | 5-(3'-nitro-4'-methylbenzoylamino)-2-aminobenzene-1-sulphonic acid. | 1-naphthyl-(2')-3-methyl-5-pyrazolone-5',7'-disulphonic acid. | 1-amino-3-methylbenzene. | ----do---- | Do. |
| 6 | ----do---- | ----do---- | 1-amino-3-acetylaminobenzene. | β-chlorocrotonic acid chloride. | Do. |
| 7 | 5-(3'-nitrobenzoylamino)-2-aminobenzene-1-sulphonic acid. | 2',5'-disulphophenyl-3-methyl-5-pyrazolone. | 1-amino-3-methylbenzene. | β-chloropropionic acid chloride. | Do. |
| 8 | ----do---- | | ----do---- | Acrylic acid chloride. | Do. |
| 9 | ----do---- | 1-naphthyl-(2')-3-methyl-5-pyrazolone-5',7'-disulphonic acid. | 1-amino-3-acetylaminobenzene. | β-bromopropionic acid chloride. | Do. |
| 10 | ----do---- | 2',5'-disulphophenyl-3-methyl-5-pyrazolone. | 1-amino-3-methylbenzene. | 2-methylamino-4,6-dibromo-1,3,5-triazine. | Do. |
| 11 | ----do---- | ----do---- | ----do---- | 2-methoxy-4,6-dichloro-1,3,5-triazine. | Do. |
| 12 | ----do---- | ----do---- | 1-aminobenzene. | 2,4,6-trichloro-5-acetylpyrimidine. | Do. |

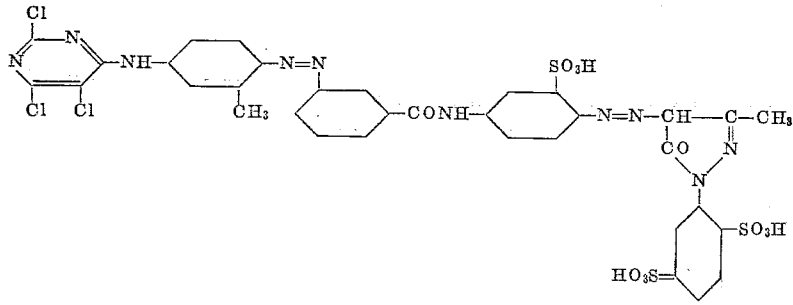

is separated with sodium chloride, filtered off, washed with dilute sodium chloride solution and dried in vacuo at 60°.

It is a yellow powder which dissolves in water with a yellow colour.

To attain fast dyeings, 2 parts of the new dyestuff are dissolved in 1000 parts of water and 20 parts of sodium carbonate are added to the solution. 100 parts of cotton are entered at 40°, the bath is heated within 30 minutes to 90–95°, 80 parts of sodium chloride are added and dyeing is performed for 1 hour at this temperature. The dyeing is then rinsed and soaped at the boil for 15 minutes. A deep yellow dyeing is obtained which has good wet and light fastness properties.

Dyestuffs having similar properties are obtained if, in the above example, instead of 5-(3'-nitrobenzoylamino)-2-aminobenzene-1-sulphonic acid, 35.1 parts of 5-(4'-methyl-3'-nitrobenzoylamino)-2-aminobenzene-1-sulphonic acid or 36.7 parts of 5-(4'-methoxy-3'-nitrobenzoylamino)-2-aminobenzene-1-sulphonic acid or 37.2 parts of 5-(4'-

EXAMPLE 2

33.7 parts of 5-(4'-nitrobenzoylamino)-2-aminobenzene-1-sulphonic acid are diazotised by the method described in Example 1 and coupled in a weakly acid medium with a solution of the sodium salt of 33.4 parts of 2',4'-disulphophenyl-3-methyl-5-pyrazolone. On completion of the dyestuff formation, the dyestuff is dissolved at 45–50°, the reaction being made neutral with sodium carbonate, and reduced over a period of 4 hours with 11.7 parts of sodium sulphide to form the aminomonoazo dyestuff. The dyestuff, which is precipitated by acidification, is filtered off, dissolved again in the form of the sodium salt and the clarified solution is further diazotised as described in Example 1 whereupon it is combined with an aqueous solution of the hydrochloride of 13.7 parts of 1-amino-2-methoxy-5-methylbenzene which has been made acid to Congo paper. The coupling is accelerated by the addition of sodium acetate solution until the pH is 4.5 and the amino disazo dyestuff formed is precipitated with sodium chloride. After the dyestuff has been filtered off, it is dissolved in 1000 parts of water with the addition of sodium carbonate and this solution is added dropwise within 1 hour at 40° to an aqueous suspension of 32 parts of 2-(2'-sulphophenylamino)-4,6-dichloro-1,3,5-triazine, the reaction always being kept neutral by the dropwise addition of sodium carbonate solution. The dyestuff of the formula

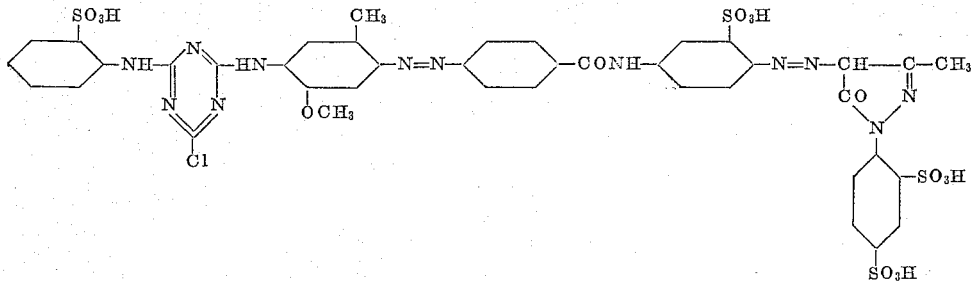

is salted out, filtered off, washed with dilute sodium chloride solution and dried in vacuo at 40–45°. It is a yellow-brown powder which dissolves in water with a reddish-yellow colour.

To attain fast dyeings, cotton is impregnated with a solution which contains 20 parts of the new dyestuff, 20 parts of sodium carbonate and 50 parts of sodium sulphate in 1000 parts of water, rolled up and stored for 24 hours at 20–30°. The reddish-yellow dyeing is then rinsed and soaped at the boil for 15 minutes. It has good fastness to wet and light.

If, in this example, the 1-amino-2-methoxy-5-methylbenzene is replaced by 10.7 parts of 1-amino-3-methylbenzene, 9.5 parts of 1-aminobenzene, 12.2 parts of 1-amino-2,5-dimethylbenzene, 15 parts of 1-amino-3-acetylaminobenzene or by 10.7 parts of monomethylaminobenzene, then by the same procedure, dyestuffs having similar properties are obtained. Similar dyestuffs are also obtained if, instead of the diazo and coupling components used in this example, one of the compounds given in the following table is used and, instead of 2-(2'-sulphophenylamino)-4,6-dichloro-1,3,5-triazine, one of the acylating agents given is used.

*Table 2*

| No. | Diazo component | 1st coupling component | 2nd coupling component | Acylating agent | Shade on cotton |
|---|---|---|---|---|---|
| 1 | 5-(4'-nitro-benzoylamino)-2-aminobenzene-1-sulphonic acid. | 1-(2'-chloro-5'-sulphophenyl)-3-methyl-5-pyrazolone. | 1-amino-3-methylbenzene | 2-(4'-sulphophenylamino)-4,6-dichloro-1,3,5-triazine. | Yellow. |
| 2 | ...do... | 2',5'-disulphophenyl-3-methyl-5-pyrazolone. | ...do... | 2,4,5,6-tetrachloropyrimidine | Do. |
| 3 | 5-(4'-nitro-3'-methyl-benzoylamino)-2-aminobenzene-1-sulphonic acid. | ...do... | ...do... | ...do... | Do. |
| 4 | ...do... | 1-naphthyl-(2')-3-methyl-5-pyrazolone-3',6'-disulphonic acid. | 1-amino-3-acetylamino-benzene. | β-chlorocrotonic acid chloride | Do. |
| 5 | ...do... | 1-naphthyl-(2')-3-methyl-5-pyrazolone 4',8'-disulphonic acid. | 1-amino-2,5-dimethylbenzene | 2,4,6-trichloro-pyrimidine | Do. |
| 6 | 5-(4'-nitro-benzoylamino)-2-aminobenzene-1-sulphonic acid. | 1-naphthyl-(2')-3-methyl-5-pyrazolone-5',7'-disulphonic acid. | 1-amino-3-methoxybenzene | 2,4,5,6-tetrachloropyrimidine | Do. |
| 7 | ...do... | 2',5'-disulphophenyl-3-methyl-5-pyrazolone. | 1-amino-2-methoxy-5-methylbenzene. | ...do... | Do. |
| 8 | ...do... | ...do... | ...do... | β-chloropropionic-acid chloride. | Do. |
| 9 | ...do... | 1-naphthyl-(2'')-3-methyl-5-pyrazolone-5',7'-disulphonic acid. | 1-amino-benzene | Acrylic acid chloride. | Do. |
| 10 | ...do... | ...do... | ...do... | Cyanuric bromide | Do. |
| 11 | ...do... | 1-(4'-methyl-2'-sulphophenyl)-3-methyl-5-pyrazolone. | 1-amino-3-methylbenzene | 2-(4'-sulphophenylamino)-4,6-dibromo-1,3,5-triazine. | Do. |
| 12 | ...do... | ...do... | 1-amino-3-acetylamino-benzene. | 2-(3'-sulphophenylamino)-4,6-dichloro-1,3,5-triazine. | Do. |
| 13 | ...do... | 1-(2',4'-disulphophenyl)-3-methyl-5-pyrazolone. | ...do... | 2-ethoxy-4,6-dichloro-1,3,5-triazine. | Do. |
| 14 | ...do... | ...do... | ...do... | 2-methylamino-4,6-dibromo-1,3,5-triazine. | Do. |
| 15 | ...do... | ...do... | 1-aminobenzene | 2,4,6-trichloro-5-acetyl-pyrimidine. | |

EXAMPLE 3

32.2 parts of 3',4'-diaminodiphenyl urea-3-sulphonic acid are tetrazotised in the usual way and combined with 10.7 parts of 1-amino-3-methylbenzene in acid solution to form the intermediate product. The solution of the intermediate product is poured within 1 hour at 0–5° to a solution made neutral with 25 parts of sodium acetate of 33.4 parts of 2',5'-disulphophenyl-3-methyl-5-pyrazolone in 400 parts of water. On completion of the coupling, the disazo dyestuff is precipitated with sodium chloride, filtered off and dissolved in 1000 parts of water at 60–65°, the reaction being made neutral by the addition of sodium carbonate. A solution of 20 parts of 2,4,6-trichloropyrimidine in 80 parts of acetone is poured into this solution within 1 hour, the reaction being always kept neutral by the dropwise addition of sodium carbonate solution. As soon as no more diazotisable amino groups can be traced, the dyestuff of the formula

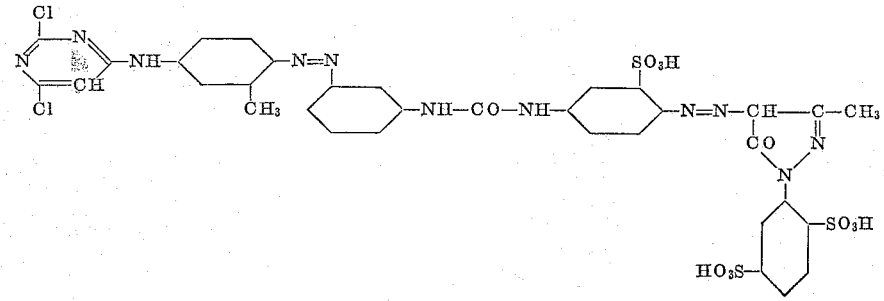

is precipitated with sodium chloride, filtered off and dried in vacuo at 60°. It is an orange-coloured powder which dissolves in water with a yellow colour.

If cotton is pad dyed with a solution which contains 20 parts of the new dyestuff, 20 parts of sodium carbonate and 200 parts of urea in 1000 parts of water, dried at 40°, subjected to a dry heat treatment for 4 hours at 140°, then rinsed and soaped at the boil for 15 minutes, then yellow dyeings are obtained which have good fastness to wet and light. Similar dyestuffs having similar properties are obtained if, in the above example, the 2′,5′-disulpho- 5-pyrazolone-4′,8′-disulphonic acid to which 25 parts of sodium acetate have been added. On completion of the coupling, the amino disazo dyestuff is precipitated with sodium chloride, filtered off and dissolved in 1000 parts of water at 60-65° with the addition of sodium carbonate. Finely pulverised 2,4,5,6-tetrachloropyrimidine is then sprinkled in within 1 hour, the reaction being kept at a pH between 6 and 7 by the dropwise addition of sodium carbonate solution. When no more free amino groups can be traced by diazotisation and coupling, the dyestuff of the formula

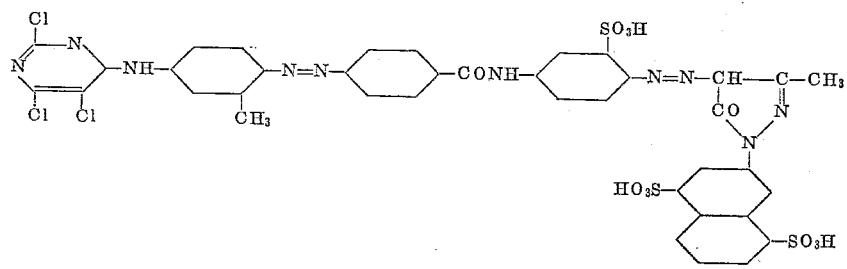

phenyl-3-methyl-5-pyrazolone is replaced by 38.4 parts of 1-naphthyl-(2′)-3-methyl-5-pyrazolone-3′,6′- or -4′,7′- or -4′,8′- or -6′,8′-disulphonic acid or by 38.4 parts of 1-naphthyl-(1′)-3-methyl-5-pyrazolone-4′,6′- or -4′,7′- or -4′,8′-disulphonic acid and otherwise the same procedure is followed.

Similar dyestuffs are also obtained if, in the above example, instead of the 32.2 parts of 3′,4-diaminodiphenyl urea-3-sulphonic acid, the 10.7 parts of 1-amino-3-methylbenzene and the 33.4 parts of 2′,5′-disulphophenyl-3-methylpyrazolone, the corresponding amount of one of the tetrazo or coupling components given in the following table is used and the dyestuffs obtained are reacted with one of the acylating agents given in the fourth column.

is precipitated with sodium chloride, filtered off and dried in vacuo at 60°. It is an orange-coloured powder which dissolves in water with a reddish yellow colour.

If cellulose material is dyed with the new dyestuff by one of the methods described in Examples 1–3, then reddish yellow dyeings are obtained which have good fastness to wet and light.

Similar dyestuffs are obtained if, in the above example, instead of the 30.7 parts of 5-(4′-aminobenzoylamino)-2-amino-benzene-1-sulphonic acid, the same number of parts of 5-(3′-aminobenzoylamino)-2-aminobenzene-1-sulphonic acid or 32.1 parts of 5-(3′-amino-4′-methylbenzoylamino)-2-aminobenzene-1-sulphonic acid or 33.7 parts of 5-(3′-amino-4′-methoxybenzoylamino)-2-amino-

*Table 3*

| No. | Tetrazo-component | 1st coupling component | 2nd coupling component | Acylating agent | Shade on cotton |
|---|---|---|---|---|---|
| 1 | 3′,4-diaminodiphenyl urea-3-sulphonic acid. | 1-amino-2,5-dimethylbenzene | 2′,4′-disulphophenyl-3-methyl-5-pyrazolone. | Cyanuric chloride | Yellow. |
| 2 | do | 1-amino-3-acetylamino-benzene. | do | 2,4,6-trichloropyrimidine | Do. |
| 3 | 4,3′-diaminodiphenyl urea-4′-sulphonic acid. | 1-aminobenzene | 1-naphthyl-(2′)-3-methyl-5-pyrazolone-4′,8′-disulphonic acid. | β-chlorocrotonic acid chloride | Do. |
| 4 | do | 1-amino-3-methylbenzene | do | 2,4,5,6-tetrachloropyrimidine | Do. |
| 5 | 4,4′-diaminodiphenyl urea-3′-sulphonic acid. | do | 2′,5′-disulphophenyl-3-methyl-5-pyrazolone. | do | Do. |
| 6 | do | 1-amino-3-carbomethoxy-aminobenzene. | do | do | Do. |
| 7 | 3′,4-diaminodiphenyl urea-3-sulphonic acid. | 1-amino-3-methyl-benzene | do | do | Do. |
| 8 | do | do | do | β-bromopropionic acid chloride. | Do. |
| 9 | do | do | 1-(2′-4′-disulphophenyl)-3-methyl-5-pyrazolone. | Acrylic acid chloride | Do. |
| 10 | do | do | do | 2,4,6-tribromopyrimidine | Do. |

EXAMPLE 4

30.7 parts of 5-(4′-aminobenzoylamino)-2-aminobenzene-1-sulphonic acid are tetrazotised in the usual way and coupled in acid solution with 10.7 parts of 1-amino-3-methylbenzene to form the intermediate product. As soon as this has been formed, it is poured within 1 hour into a solution of 38.4 parts of 1-naphthyl-(2′)-3-methylbenzene-1-sulphonic acid are used and otherwise the procedure described in this example is followed.

Similar dyestuffs are also obtained if the tetrazo and coupling components are placed by one of those given in the following table and the dyestuffs are treated with an acid halide or halogenazine mentioned in the fourth column.

Table 4

| No. | Tetrazo-component | 1st coupling component | 2nd coupling component | Acylating agent | Shade on cotton |
|---|---|---|---|---|---|
| 1 | 5-(4'-aminobenzoylamino)-2-aminobenzene-1-sulphonic acid. | 1-amino-3-acetylamino-benzene. | 2',4'-disulphophenyl-3-methyl-5-pyrazolone. | β-chlorocrotonic acid chloride. | Yellow. |
| 2 | ....do.... | 1-amino-3-methylbenzene. | ....do.... | β-bromocrotonic acid chloride. | Do. |
| 3 | 5-(4'-amino-3'-methylbenzoylamino)-2-aminobenzene-1-sulphonic acid. | ....do.... | 1-naphthyl-(2')-3-methyl-5-pyrazolone-5',7'-sulphonic acid. | 2,4,6-trichloropyrimidine. | Reddish yellow. |
| 4 | 5-(3'-aminobenzoylamino)-2-aminobenzene-1-sulphonic acid. | 1-amino-2,5-dimethyl-benzene. | 1-(2'-chloro-5'-sulphophenyl)-3-methyl-5-pyrazolone. | 2-(2'-sulphophenylamino)-4,6-dichloro-1,3,5-triazine. | Yellow. |
| 5 | 5-(4'-aminobenzoylamino)-1-aminobenzene-2-sulphonic acid. | 1-amino-2-methoxy-5-methylbenzene. | 2',5'-disulphophenyl-3-methyl-5-pyrazolone. | 2,4,5,6-tetrachloropyrimidine. | Do. |
| 6 | ....do.... | 1-amino-3-methylbenzene. | ....do.... | β-bromoacrylic acid chloride. | Do. |

What we claim is:
1. Reactive dyestuff of the formula

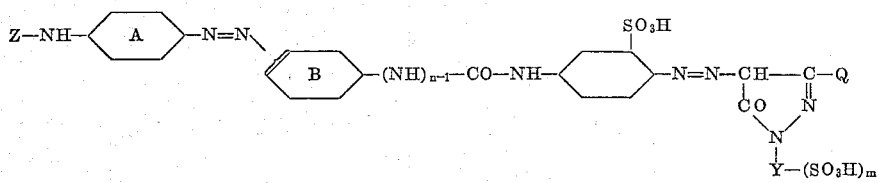

wherein Z is a member selected from the group consisting of 5-acetyl-2,4-dihalogeno-pyrimidyl, 2,4-dihalogeno-pyrimidyl, 2,4,5-trihalogenopyrimidyl, (sulpho-phenyl-amino) - monohalogeno - 1,3-5 - triazinyl, methylamino-monohalogeno-1,3,5- triazinyl, methoxy - monohalogeno-1,3,5 - triazinyl, ethoxy-monohalogeno-1,3,5 - trizinyl, β-halogeno (lower) alkylcarbonyl and $CH_2=CH-CO$, the halogen having an atomic weight of 35 to 80, and wherein said pyrimidyl is bonded to the —NH-group at the six position.

A contains substituents selected from the group consisting of H, lower alkyl, lower alkoxy, —NHCOCH$_3$ and lower alkoxy-carbonylamino, B contains substituents selected from the group consisting of H, lower alkyl, lower alkoxy and chlorine,
Y is a member selected from the group consisting of phenyl, methylphenyl, chlorpheny and naphthyl,
Q is a member selected from the group consisting of —CH$_3$ and —COOH, and
$n$ and $m$ each represents a positive whole number of up to 2.

2. The reactive dyestuff of the formula

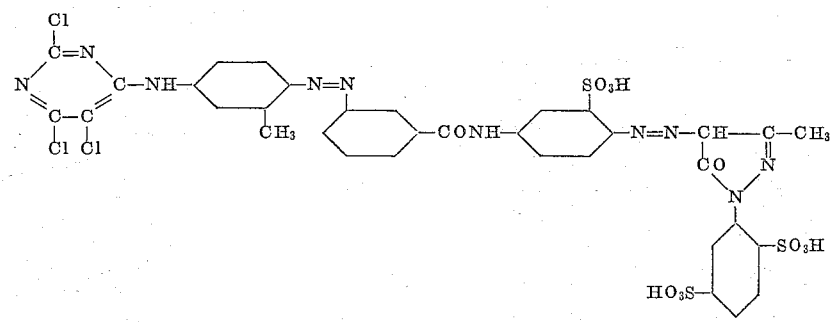

3. The reactive dyestuff of the formula

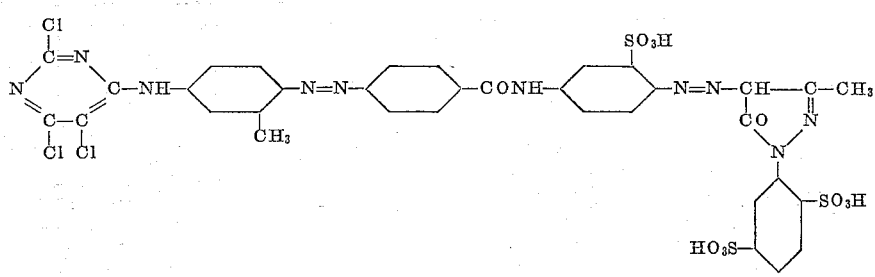

4. The reactive dyestuff of the formula
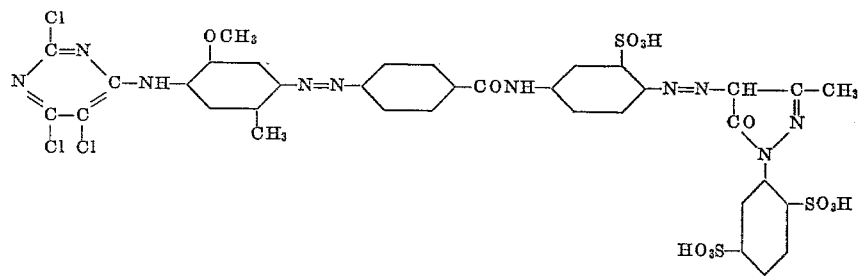
5. The reactive dyestuff of the formula
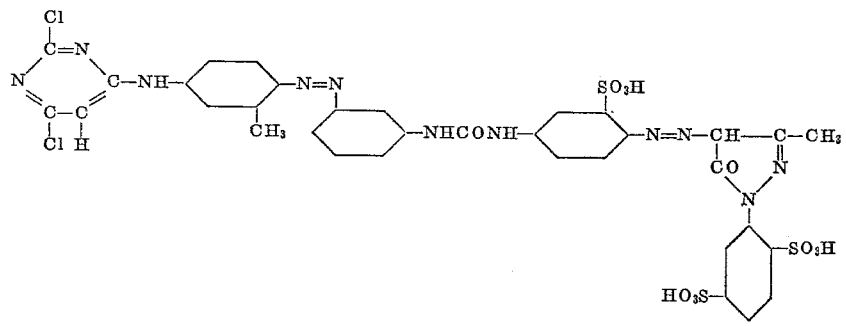
References Cited by the Examiner
FOREIGN PATENTS
1,221,621   1/60   France.
CHARLES B. PARKER, *Primary Examiner.*
LEON ZITVER, *Examiner.*